(12) United States Patent
Tang et al.

(10) Patent No.: US 7,496,117 B2
(45) Date of Patent: Feb. 24, 2009

(54) LASER ARRANGEMENT AND A METHOD FOR GENERATING POWER PULSES

(75) Inventors: Dingyuan Tang, Singapore (SG); Luming Zhao, Singapore (SG)

(73) Assignee: Nanyang Technological University, Singapore (SG)

( * ) Notice: Subject to any disclaimer, the term of this patent is extended or adjusted under 35 U.S.C. 154(b) by 1 day.

(21) Appl. No.: 11/602,397

(22) Filed: Nov. 21, 2006

(65) Prior Publication Data

US 2008/0117940 A1 May 22, 2008

(51) Int. Cl.
*H01S 3/30* (2006.01)
*H01S 3/10* (2006.01)
*H01S 3/13* (2006.01)

(52) U.S. Cl. .............................. 372/6; 372/25; 372/30
(58) Field of Classification Search ................. 372/6, 372/94, 29.02, 30, 92, 108; 359/333
See application file for complete search history.

(56) References Cited

U.S. PATENT DOCUMENTS

| | | | | |
|---|---|---|---|---|
| 5,513,194 | A | * | 4/1996 | Tamura et al. .................. 372/6 |
| 5,530,582 | A | * | 6/1996 | Clark .......................... 359/333 |
| 5,880,877 | A | | 3/1999 | Fermann |
| 7,292,749 | B2 | * | 11/2007 | Gluckstad et al. ............. 385/28 |
| 2005/0238066 | A1 | | 10/2005 | Liu |
| 2006/0153251 | A1 | | 7/2006 | Wang |

OTHER PUBLICATIONS

"Mechanism of multisoliton formation and soliton energy quantization in passively mode-locked fiber lasers," D.Y. Tang et al., The American Physical Society 2005, Physical Review A 72, 043816 (1-9) (2005).

(Continued)

*Primary Examiner*—Armando Rodriguez
(74) *Attorney, Agent, or Firm*—Davidson Berquist Jackson & Gowdey, LLP

(57) ABSTRACT

A laser arrangement including a gain fiber to provide nonlinear amplification, the gain fiber having a first end and a second end, a dispersion adaptation fiber having a first end and a second end, and an output coupler is disclosed. The first end of the dispersion adaptation fiber is connected to the first end of the gain fiber, and the second end of the dispersion adaptation fiber is connected to the second end of the gain fiber, thereby forming a laser cavity. The dispersion adaptation fiber has a length in relation to a length of the gain fiber such that the laser cavity has a net group velocity dispersion which is positive or below a predetermined threshold, and the dispersion adaptation fiber further includes a compression fiber providing nonlinear compression and having a first end and a second end. The first end of the compression fiber is connected to one end of the gain fiber and the second end of the compression fiber is connected to the output coupler. The output coupler is positioned at a predetermined distance away from the gain fiber such that a generated pulse has a pulse width in the laser cavity, the pulse width being narrower than a predefined pulse width value. A method for generating power pulses is also disclosed. The method includes generating a large energy gain-guided soliton by using nonlinear amplification in a positive group velocity dispersion fiber, and propagating the gain-guided soliton through a negative group velocity dispersion fiber for nonlinear compression in a laser cavity round-trip.

20 Claims, 2 Drawing Sheets

OTHER PUBLICATIONS

"Stretched-Pulse Additive Pulse Mode-Locking in Fiber Ring Lasers: Theory and Experiment," H.A. Haus et al., IEEE Journal of Quantum Electronics. vol. 31, No. 3, Mar. 1995, (p. 591-598).

"High-power Ultrafast Fiber Laser Systems," Jens Limpert et al., IEEE Journal of Selected Topics in Quantum Electronics, vol. 12, No. 2, Mar./Apr. 2006 (p. 233-244).

Tang, D. Y. et al., "Generation of 47-fs pulses directly from an erbium-doped fiber laser," Optical Society of America, vol. 32, No. 1, Jan. 1, 2007.

Zhao, L. M. et al., "Gain-guided soliton in a positive group-dispersion fiber laser," Optical Society of America, vol. 31, No. 12, Jun. 15, 2006.

Zhao, L. M. et al., "Gain-guided solitons in dispersion-managed fiber lasers with large net cavity dispersion," Optical Society of America, vol. 31, No. 20, Oct. 15, 2006.

* cited by examiner

LASER ARRANGEMENT AND A METHOD FOR GENERATING POWER PULSES

FIELD OF THE INVENTION

The present invention relates to the field of lasers and in particular, to a laser arrangement and a method for generating power pulses.

BACKGROUND OF THE INVENTION

High-power ultrashort pulse lasers have wide range of applications in scientific research, industrial material processing, and life science. Traditionally, high-power ultrashort pulses are generated using the mode-locking technique of solid-state lasers, which are bulky, expensive, and difficult to operate. Passively mode-locked fiber lasers are an attractive alternative to solid-state lasers for generating femtosecond optical pulses. Fiber lasers are compact in size, cost effective and easy to operate. Several methods can be used to achieve passive mode locking in fiber lasers, for example the semiconductor saturable absorber mirror (SESAM) method, the nonlinear loop mirror (NLP) method and the nonlinear polarization rotation (NPR) method. However, due to its simplicity, stability and ultrafast recovery time, the NPR method has attracted great attention and is widely used. Using the NPR technique to generate femtosecond optical pulses in the erbium-doped fiber lasers is now a routine work.

However, a fundamental drawback of the passively mode-locked fiber lasers is that the generated optical pulses have only low pulse energy and peak power in the respective range of several pico-joules and several hundred watts. It was generally believed that the soliton operation of the fiber lasers limited the maximum achievable pulse energy and peak power. The NPR mode-locking action becomes saturated when the nonlinear phase shift of a mode-locked pulse accumulated within one cavity round-trip exceeds a certain value. Under soliton operation of the lasers this value can be easily reached.

To boost energy of the mode-locked pulses, a number of techniques were implemented. One is the stretched-pulse technique as disclosed in publication "Stretched-Pulse Additive Pulse Mode-Locking in Fiber Ring Lasers: Theory and Experiment", H. A. Haus et al., IEEE Journal of Quantum Electronics. Vol 31, No. 3, March 1995. The idea of the stretched-pulse technique is to use fibers of large positive and negative group velocity dispersion (GVD) to construct the fiber laser cavity. As an optical pulse circulating in such a laser cavity is temporally stretched and compressed in one transit, the average peak power of the mode-locked pulse becomes lower than that of a transform-limited pulse of the same spectral bandwidth. Therefore, the effective nonlinear phase shift accumulated in one cavity round-trip is smaller, and pulse with larger energy can be obtained. The output pulses of stretched-pulse fiber lasers generally have picosecond duration and are linearly chirped. To obtain sub-100 fs pulses the laser output needs to be further compressed through an external pulse compression system, which makes the lasers inconvenient to use.

Another technique of generating high power ultrashort pulses from the fiber based systems is the so-called Master Oscillator and Power Amplification (MOPA) method as disclosed in publication "High-power Ultrafast Fiber Laser Systems", Jens Limpert et al., Journal of Selected Topics in Quantum Electronics, Vol. 12, No. 2, March/April 2006, where light pulse from a stable low power fiber laser is first power amplified by a fiber amplification system, and then linearly compressed. Current high power ultrashort fiber laser systems are made based on this technique. In this fiber system apart from the laser oscillator, it also has an external cavity pulse amplification part and a pulse compression part, which may complicate the system.

Therefore, an objective of the present invention is to provide an alternative method to generate high peak power ultrafast near transform-limited pulses directly from the passively mode locked fiber lasers thereby advantageously avoids or reduces some of the above-mentioned drawbacks of prior art devices. It is also an objective of the present invention to provide an alternative laser arrangement which can be used with the method for better performance.

SUMMARY OF THE INVENTION

In one embodiment of the invention, a laser arrangement is provided including a gain fiber to provide nonlinear amplification, the gain fiber having a first end and a second end, a dispersion adaptation fiber having a first end and a second end, and an output coupler. The first end of the dispersion adaptation fiber is connected to the first end of the gain fiber, and the second end of the dispersion adaptation fiber is connected to the second end of the gain fiber, thereby forming a laser cavity. The dispersion adaptation fiber has a length in relation to a length of the gain fiber such that the laser cavity has a net group velocity dispersion which is positive or below a predetermined threshold, and the dispersion adaptation fiber further includes a compensation fiber providing nonlinear compression and having a first end and a second end. The first end of the compression fiber is connected to one end of the gain fiber and the second end of the compression fiber is connected to the output coupler. The output coupler is positioned at a predetermined distance away from the gain fiber such that a generated pulse has a pulse width in the laser cavity, the pulse width being narrower than a predefined pulse width value.

In another embodiment of the invention, a method for generating power pulses is provided including generating an energy gain-guided soliton by using nonlinear amplification in a positive group velocity dispersion fiber, and propagating the gain-guided soliton through a negative group velocity dispersion fiber for nonlinear compression in a laser cavity round-trip.

The following figures illustrate various exemplary embodiments of the present invention. However, it should be noted that the present invention is not limited to the exemplary embodiments illustrated in the following figures.

DETAILED DESCRIPTION OF THE INVENTION

Exemplary embodiments of a laser arrangement and a method for generating power pulses are described in details below with reference to the accompanying figures. In addition, the exemplary embodiments described below can be modified in various aspects without changing the essence of the invention.

Figure 1:
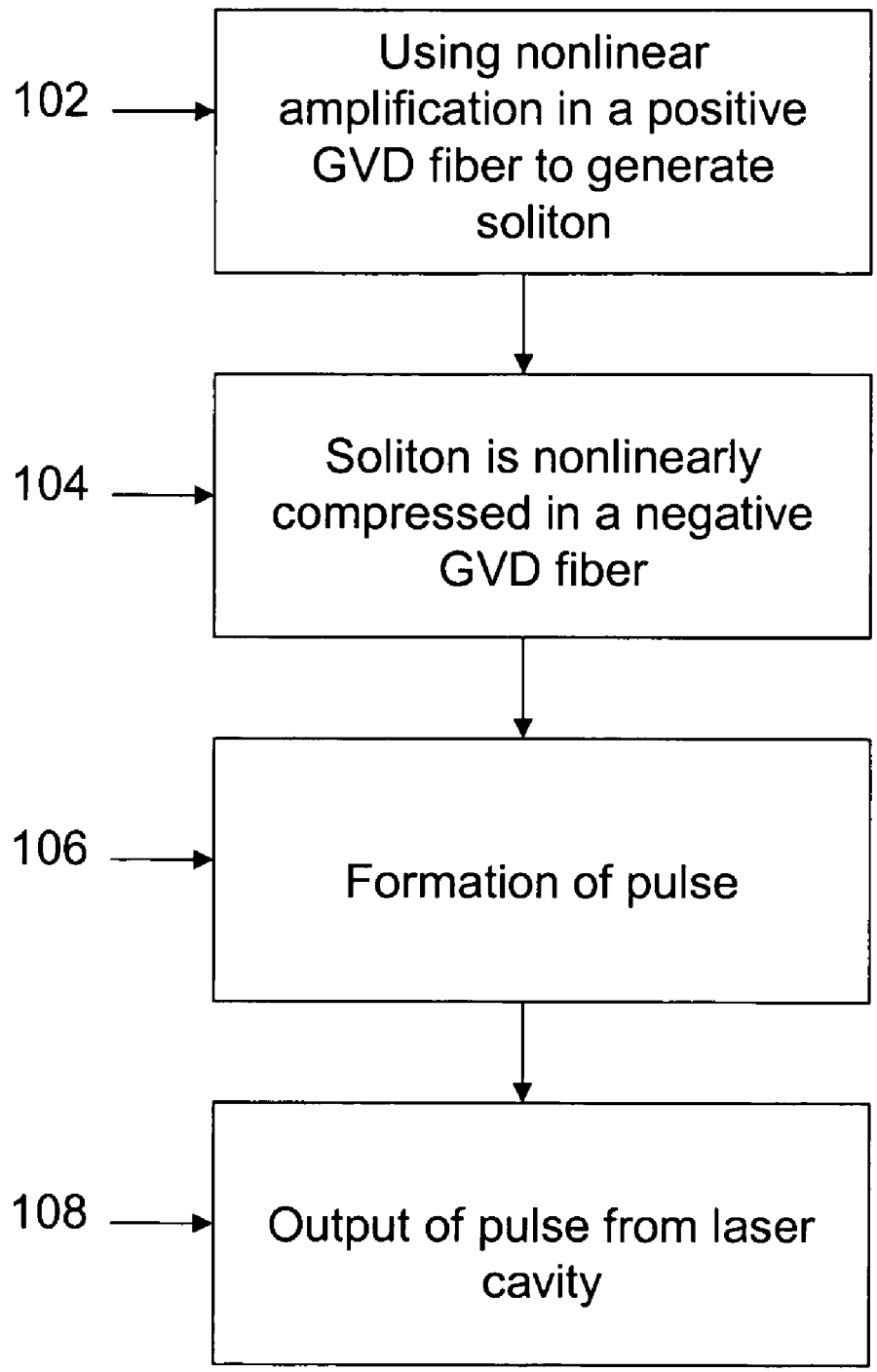
FIG. 1 shows a flow diagram for a method of generating power pulses from a laser according to an embodiment of the present invention.

FIG. 1 shows a flow diagram for a method of generating power pulses from a laser according to an embodiment of the present invention. The working principle of the method is to use nonlinear amplification in a positive group velocity dispersion (GVD) fiber to generate a large energy gain-guided soliton in step 102. As positive GVD gain fiber is used, pulse collapse effect is avoided. The gain-guided soliton is then nonlinearly compressed through propagating in a negative GVD fiber in step 104. It is necessary to use the nonlinear pulse compression to dechirp the nonlinear pulse chirp generated during the nonlinear pulse amplification process. Through the nonlinear pulse compression, a transform-limited ultrashort pulse will always be formed in step 106. Once the ultrashort pulse is formed, it will be output from a laser cavity in step 108. The output coupling strength of the laser will be selected so that after output the pulse will subsequently propagate in the rest of the laser cavity with very low nonlinearity. In this case the total accumulated nonlinear phase shift between the two polarization components of the pulse still remains small. Therefore, the effect of multiple pulse formation is also suppressed. The method can be used in fiber lasers, solid state lasers (e.g. crystal laser), chemical lasers, dye lasers but not so limited.

A mode-locked fiber laser is a very complicated system. Although through incorporating the nonlinear pulse amplification and nonlinear pulse compression in the pulse shaping process of a mode-locked pulse can generate ultrashort high peak-power pulses, generally, a mode-locked fiber laser cannot automatically operate in such an ideal state. In order to force a laser to operate in the state, special design on the laser cavity must be done.

Figure 2:
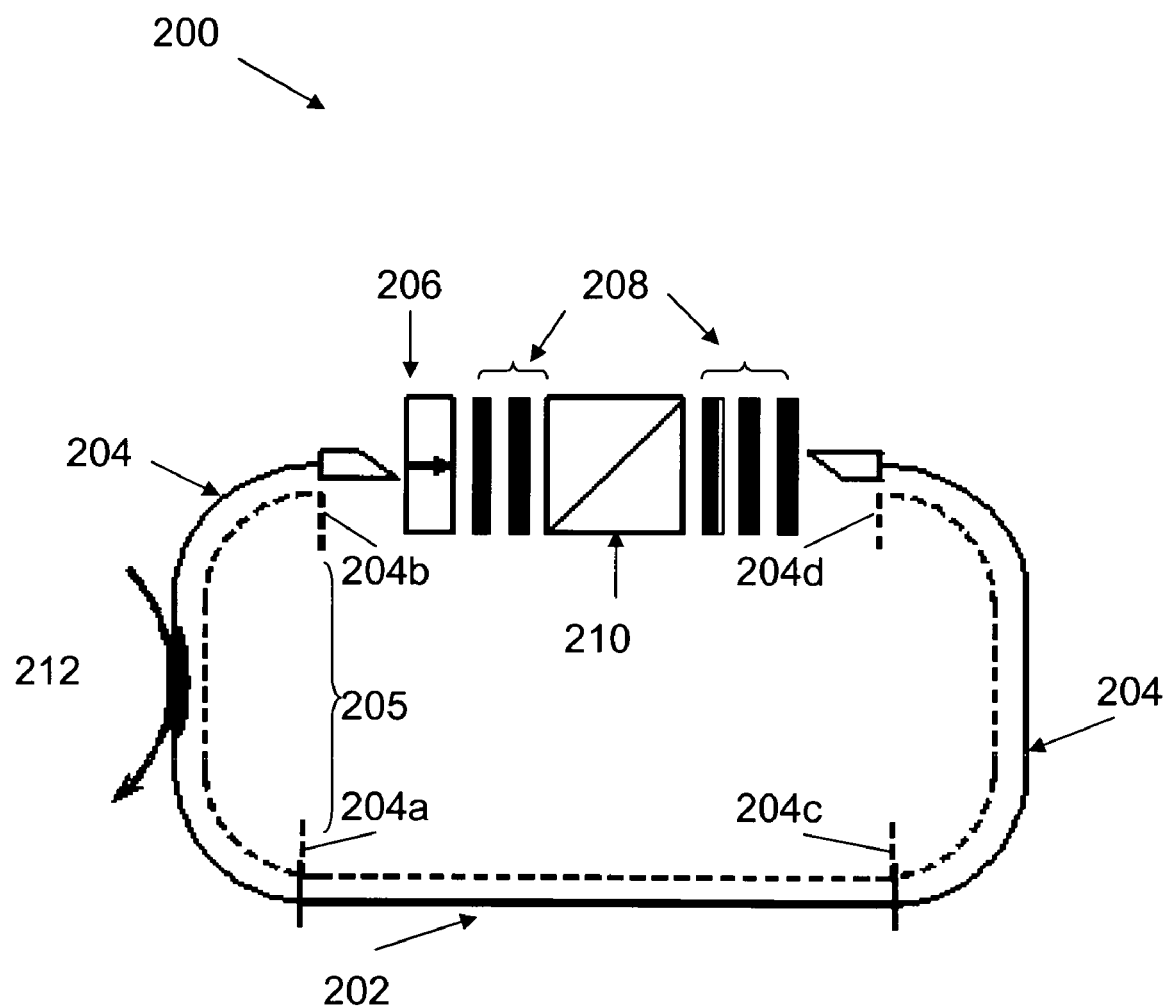
FIG. 2 shows a schematic diagram of a laser arrangement constructed according to an embodiment of the present invention.

FIG. 2 shows a schematic diagram of a laser arrangement constructed according to an embodiment of the present invention. The laser arrangement 200 or fiber laser cavity may include a section of gain fiber 202, sections of dispersion adaptation fiber 204, a polarization independent isolator 206, two polarization controllers 208 and a polarizing beam splitter (BS) 210 connected in a ring.

The gain fiber 202 may be any suitable fiber with positive GVD. Some examples of fibers with positive GVD includes pump fibers and doped fibers for example, erbium-doped fiber (EDF), ytterbium-doped fiber, thulium-doped fiber, but not so limited. In FIG. 2, the gain fiber 202 may be a 210 cm 2880 parts per million (ppm) erbium-doped fiber with GVD of approximately −52 ps/nm/km at a wavelength of approximately 1550 nm, but any suitable length, doping concentration and GVD values may also be used.

The dispersion adaptation fiber 204 may be any suitable single mode fiber (SMF) or multi-mode fiber (MMF) with negative GVD. In FIG. 2, the dispersion adaptation fiber 204 may be made up of two sections and have a combined length of approximately 302 cm with negative GVD of approximately 18 ps/nm/kin at a wavelength of approximately 1550 nm, but any suitable length and GVD values may also be used. The first section may have a length of approximately 62 cm and the second section may have a length of approximately 240 cm, giving rise to a combined length of approximately 302 cm. The first section of the dispersion adaptation fiber 204 can be termed the compression fiber 205 as it serves to compress a light pulse in a nonlinear manner and the first section has two ends, one end 204a is connected to a first end of the gain fiber 202 and the other end 204b is connected to the polarization independent isolator 206. The second section of the dispersion adaptation fiber 204 also has two ends, one end 204c is connected to the second end of the gain fiber 204 and the other end 204d is connected to one of the polarization controllers 208. The respective sections of the dispersion adaptation fibers 204 are being spliced together with the gain fiber 202 so that the losses may be small and can be ignored.

The polarization-independent isolator (I) 206 may be used to force unidirectional operation of the ring.

The two polarization controllers 208 may include a first polarization controller 208 which may be two quarter-wave plates ($\lambda/4$) and a second polarization controller 208 which may be two quarter-wave plates ($\lambda/4$) and one half-wave plate ($\lambda/2$) arranged in between. The polarization controllers 208 may be a single plate, a plurality of wave plates or any combination thereof. The polarization controllers 208 can be used to control the polarization of light in the laser cavity 200. The output coupling strength depends on the orientation of the respective wave-plates and can be between 30% to 70% of the intra-cavity pulse energy, preferably more than 50% of the intra-cavity pulse energy. In an embodiment of the present invention, the larger the coupling, the better the performance of the laser cavity 200. However, the coupling cannot be too large due to many practical limitations, for example mode-locking self-starting requirement. With smaller output coupling, the output pulse peak power will drop. Therefore, the smaller the output coupling, the lower the output pulse peak power. A likely reason may be that with smaller output coupling, the light inside the dispersion adaptation fiber 204 becomes stronger, which is not optimized for laser performance.

The polarizing beam splitter (BS) 210 may be used as a polarizer in the laser cavity 200 for the NPR mode-locking and as a laser output coupler. The polarizer only outputs the rejected polarization component of the NPR mode locking. The polarizing BS 210 and the polarizer may be an integrated device or it may be separate devices.

The polarization controllers 208, the polarization-independent isolator 206 and the polarizing beam splitter 210 are mounted on an approximately 76 mm long fiber bench.

A wavelength-division-multiplexing (WDM) coupler 212 made of SMF may be used to couple the pump light into the laser cavity 200. The WDM coupler 212 may be on any section of the dispersion adaptation fiber 204. Other suitable devices for coupling the pump light into the laser cavity 200 may also be used. Some examples include a beam splitter and etc.

Some considerations of the fiber laser cavity design include selections of the laser output coupler position, the relative lengths of the fibers with positive and negative GVD. Depending on the maximum available power of the pump laser and the doping concentration of the erbium-doped fiber, the length of the erbium-doped fiber is selected to be approximately 210 cm in this case but not so limited. The selected length of the erbium-doped fiber also determines a corresponding combined SMF length of about 302 cm to keep the cavity net GVD positive and near zero. The cavity net GVD may be in the range of approximately 0 $ps^2$ to approximately 0.07 $ps^2$. Therefore, depending on the net cavity GVD, the respective lengths of the fiber could be varied accordingly. The laser output coupler is positioned at one end of the compression fiber, at approximately 62 cm away from the gain fiber, where the mode-locked pulse has the narrowest width in the cavity. The tolerance range for the length change of the compression fiber for achieving the narrowest pulse width in the laser cavity is between approximately 0% to approximately 5%. When the length of the compression fiber changes by approximately less than approximately 2.5%, high peak power pulses can still be obtained. However, any changes in length of the compression fiber greater than approximately 5% may not be optimized.

The fiber laser cavity design may have the following characteristics. Firstly, the cavity is both dispersion and nonlinearity managed. As the gain fiber has positive GVD, pulse propagating in the gain fiber is temporally broadened and nonlinearly amplified. Subsequently, when the pulse propagates in the dispersion adaptation fiber which has negative GVD, pulse is nonlinearly compressed and de-chirped. A transform-limited pulse is then formed at the position of the laser output and coupled out of the laser cavity. Through using an output coupler of large output coupling, the pulse energy is significantly reduced. Therefore, after the intracavity polarizer, it propagates almost linearly in the rest of the negative GVD fiber.

Secondly, due to the strong nonlinearity in the nonlinear pulse compression process, the transform-limited pulse spectrum can become broader than the gain bandwidth. Therefore, ultrashort pulse beyond the gain bandwidth limitation could be directly generated in the laser.

Thirdly, as strong nonlinearity only occurs in a small segment of the cavity, the effective nonlinear phase delay between the two polarization modes of the pulse accumulated in the cavity round-trip is still low, the cavity pulse peak clamping effect is not a serious limitation on the pulse peak.

Fourthly, the net cavity GVD is positive and close to zero, where the narrowest pulse with large pulse energy could be generated.

Fifthly, a polarization beam splitter is used as the output coupler, which outputs only the rejected polarization of the NPR mode-locking, therefore, the cavity can have high nonlinearity operation, and even with large output coupling, self-started mode-locking can still be achieved.

Finally, it is to be noted that although the fiber laser cavity has a similar configuration as that of stretched pulse fiber lasers, the design principle is completely different. In the stretched pulse fiber lasers, dispersion management is to reduce the effective cavity nonlinearity; therefore, fibers with large GVD should be used. In contrast, in the current case dispersion management is used together with the nonlinearity management, and with the purpose of possibly increasing the local nonlinearity of the cavity.

RESULTS

With the fiber laser cavity design of the present invention, self-started mode locking can be easily achieved in the laser. Near transform-limited laser pulse with pulse energy of approximately 2.08 nJ, pulse width of approximately 46.2 fs (assuming the pulses have sech-form profile) at a pulse repetition rate of approximately 38.3 MHz may be obtained. The peak power of the pulse may be as high as approximately 36 kW. The obtained result could be better but may be limited by available pump power source, which may have a maximum power of approximately 700 mw, and the erbium-doped fiber used. Better result may be possible if the gain fiber with an even large doping concentration may be used.

APPLICATIONS

The developed fiber laser may overcome some of the problems associated with the conventional soliton fiber lasers for high peak power generation. It has large pulse energy and ultrashort pulse width. In addition, like all the other fiber lasers, it is compact and has excellent stability. The fiber laser can also be used in a number of applications to replace the femtosecond solid-state lasers, e.g. used for the fundamental researches, ultrafast spectroscopy, pump-probe studies at 1.5 μm, optical switching and signal processing studies, two-photon microscopy, Terahertz (THz) time-domain spectroscopy and imaging, optical coherent tomography (OCT), micro- and nano-fabrication of polymer materials.

The developed high power, ultrashort pulse fiber laser is potentially useful for many applications. In addition, the new ultrashort pulse generation technique is also very useful. The technique shows the possibility of using the nonlinear features of the laser cavity to enhance the performance of the mode-locked lasers. The developed technique may also be equally applied to other mode-locked lasers, such as the different types of fiber laser and the solid-state lasers. For the mode-locked solid-state lasers, as the mode-locked pulse energy and peak power is further increased, the nonlinear cavity effects start to play an important role. The technique has illustrated how to use this feature of a laser to improve its performance. The proposed laser cavity design and technique may be used in the next generation of mode-locked laser systems.

The aforementioned description of the various embodiments has been presented for purposes of illustration and description. It is not intended to be exhaustive or to limit the invention to the precise form disclosed, and obviously many modifications and variations are possible in light of the disclosed teaching. It is intended that the scope of the invention be defined by the claims appended hereto.

What is claimed is:

1. A laser arrangement comprising:
    a gain fiber to provide nonlinear amplification, the gain fiber having a first end and a second end;
    a dispersion adaptation fiber having a first end and a second end,
    an output coupler,
    the first end of the dispersion adaptation fiber being connected to the first end of the gain fiber, and the second end of the dispersion adaptation fiber being connected to the second end of the gain fiber, thereby forming a laser cavity,
    the dispersion adaptation fiber having a length in relation to a length of the gain fiber such that the laser cavity has a net group velocity dispersion which is positive or below a predetermined threshold, and
    the dispersion adaptation fiber further comprising a compression fiber providing nonlinear compression and having a first end and a second end,
    the first end of the compensation fiber being connected to one end of the gain fiber and the second end of the compensation fiber being connected to the output coupler, the output coupler being positioned at a predetermined distance away from the gain fiber such that a generated pulse has a substantially narrowest pulse width in the laser cavity.

2. The laser arrangement of claim 1,
    the gain fiber comprises a positive group velocity dispersion fiber.

3. The laser arrangement of claim 1,
    the dispersion adaptation fiber comprises a negative group velocity dispersion fiber.

4. The laser arrangement of claim 1,
    the laser cavity has a net group velocity dispersion in the range of about 0 $ps^2$ to about 0.07 $ps^2$.

5. The laser arrangement of claim 1,
    the compensation fiber has a change in length in the range of about 0% to about 5%.

6. The laser arrangement of claim 1,
    the output coupler being configured such that the output coupling strength is in the range of about 30% to about 70% of intracavity pulse energy.

7. The laser arrangement of claim 6,
the output coupler is configured such that the output coupling strength is larger than about 50% of intracavity pulse energy.

8. The laser arrangement of claim 1,
the output coupler comprising a polarization beam splitter.

9. The laser arrangement of claim 8,
the polarization beam splitter comprising a polarizer.

10. The laser arrangement of claim 1, further comprising a polarization independent isolator being positioned at one end of the compression fiber.

11. The laser arrangement of claim 1, further comprising at least one polarization controllers being positioned at one end of the compression fiber.

12. The laser arrangement of claim 11,
the polarization controllers being respectively positioned on both sides of the output coupler.

13. The laser arrangement of claim 12,
the polarization controllers comprising half-wave plates or quarter-wave plates.

14. The laser arrangement of claim 1, further comprising a wavelength-division-multiplexing coupler being positioned on the dispersion adaptation fiber.

15. The laser arrangement of claim 14, further comprising a wavelength-division-multiplexing coupler being positioned on the compression fiber.

16. The laser arrangement of claim 1,
the dispersion adaptation fiber comprising a single-mode or a multi-mode fiber.

17. The laser arrangement of claim 1,
the dispersion adaptation fiber comprising a photonic crystal.

18. The laser arrangement of claim 1,
the gain fiber comprising a doped fiber.

19. The laser arrangement of claim 18,
the gain fiber being selected from a group of doped fibers consisting of erbium-doped fiber, thulium-doped fiber, ytterbium-doped fiber.

20. A method for generating transform limited power pulses, comprising:
generating an energy gain-guided soliton by using nonlinear amplification in a positive group velocity dispersion fiber,
propagating the gain-guided soliton through a negative group velocity dispersion fiber for nonlinear compression in a laser cavity round-trip;
generating a pulse based on the propagated gain-guided soliton and outputting the generated transform limited pulse from an output coupler;
wherein the negative group velocity dispersion fiber has a length in relation to a length of the positive group velocity dispersion fiber such that the laser cavity has a net group velocity dispersion which is positive or below a predetermined threshold, and
wherein the output coupler is positioned at a predetermined distance away from the positive group velocity dispersion fiber such that the generated pulse has a substantially narrowest pulse width in the laser cavity.

* * * * *

UNITED STATES PATENT AND TRADEMARK OFFICE
CERTIFICATE OF CORRECTION

PATENT NO. : 7,496,117 B2  
APPLICATION NO. : 11/602397  
DATED : February 24, 2009  
INVENTOR(S) : Tang et al.

Page 1 of 1

It is certified that error appears in the above-identified patent and that said Letters Patent is hereby corrected as shown below:

In col. 6, line 45, change "compensation" to --compression--; and  
In col. 6, line 47, change "compensation" to --compression--.

Signed and Sealed this

Fourteenth Day of April, 2009

JOHN DOLL  
*Acting Director of the United States Patent and Trademark Office*